US010755149B2

(12) United States Patent
Kolouri et al.

(10) Patent No.: US 10,755,149 B2
(45) Date of Patent: Aug. 25, 2020

(54) ZERO SHOT MACHINE VISION SYSTEM VIA JOINT SPARSE REPRESENTATIONS

(71) Applicant: HRL Laboratories, LLC, Malibu, CA (US)

(72) Inventors: Soheil Kolouri, Calabasas, CA (US); Shankar R. Rao, Agoura Hills, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 106 days.

(21) Appl. No.: 15/949,896

(22) Filed: Apr. 10, 2018

(65) Prior Publication Data

US 2018/0322373 A1    Nov. 8, 2018

Related U.S. Application Data

(60) Provisional application No. 62/502,461, filed on May 5, 2017.

(51) Int. Cl.
| | |
|---|---|
| G06K 9/72 | (2006.01) |
| G06K 9/62 | (2006.01) |
| G06N 3/04 | (2006.01) |
| G06N 3/08 | (2006.01) |
| B60W 10/20 | (2006.01) |

(Continued)

(52) U.S. Cl.
CPC .......... *G06K 9/726* (2013.01); *G06K 9/6249* (2013.01); *G06K 9/6255* (2013.01); *G06K 9/6257* (2013.01); *G06K 9/6259* (2013.01); *G06K 9/6267* (2013.01); *G06N 3/04* (2013.01); *G06N 3/0454* (2013.01); *G06N 3/08* (2013.01); *B60W 10/18* (2013.01); *B60W 10/20* (2013.01);

(Continued)

(58) Field of Classification Search
CPC .. G05D 1/0088; G05D 1/0246; G06K 9/6249; G06K 9/6259; G06K 9/00791; G06K 9/00818; G06K 9/4628; G06K 9/6255; G06K 9/6257; G06K 9/6262; G06K 9/6267; G06K 9/627; G06K 9/726; B60W 10/18; B60W 10/20; G06N 3/04; G06N 3/0454; G06N 3/08
See application file for complete search history.

(56) References Cited

U.S. PATENT DOCUMENTS

| | | |
|---|---|---|
| 2003/0202683 A1 | 10/2003 | Ma et al. |
| 2011/0191374 A1 | 8/2011 | Engio et al. |

(Continued)

OTHER PUBLICATIONS

Liang, Heming, and Qi Li. "Hyperspectral imagery classification using sparse representations of convolutional neural network features." Remote Sensing 8.2 (2016): 99. (Year: 2016).*

(Continued)

*Primary Examiner* — Nirav G Patel
(74) *Attorney, Agent, or Firm* — Tope-McKay & Associates

(57) ABSTRACT

Described is a system that can recognize novel objects that the system has never before seen. The system uses a training image set to learn a model that maps visual features from known images to semantic attributes. The learned model is used to map visual features of an unseen input image to semantic attributes. The unseen input image is classified as belonging to an image class with a class label. A device is controlled based on the class label.

17 Claims, 6 Drawing Sheets

(51) Int. Cl.
  *G05D 1/00* (2006.01)
  *B60W 10/18* (2012.01)
  *G06K 9/46* (2006.01)
  *G06K 9/00* (2006.01)

(52) U.S. Cl.
  CPC ....... *G05D 1/0088* (2013.01); *G06K 9/00818* (2013.01); *G06K 9/4628* (2013.01)

(56) References Cited

U.S. PATENT DOCUMENTS

| | | |
|---|---|---|
| 2016/0239711 A1 | 8/2016 | Gong et al. |
| 2017/0006261 A1 | 1/2017 | Debilde et al. |
| 2018/0260651 A1* | 9/2018 | Wang .................. G06K 9/3241 |

OTHER PUBLICATIONS

Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826. 2013.

Romera-Paredes, Bernardino, and P. H. S. Torr. "An embarrassingly simple approach to zero-shot learning." In Proceedings of the 32nd International Conference on Machine Learning, pp. 2152-2161. 2015.

Simonyan, Karen, and Andrew Zisserman. "Very deep convolutional networks for large-scale image recognition." arXiv preprint arXiv:1409.1556. 2014, pp. 1-14.

Mikolov, T., Sutskever, I., Chen, K., Corrado, G.S. and Dean, J., 20. "Distributed representations of words and phrases and their compositionality." In Advances in Neural Information Processing Systems, pp. 3111-3119. 2013.

Tibshirani, Ryan J. "The lasso problem and uniqueness." Electronic Journal of Statistics, 7, pp. 1456-1490. 2013.

Huang, Yongwei, and Daniel R Palomar. "Randomized algorithms for optimal solutions of double-sided QCQP with applications in signal processing." IEEE Transactions on Signal Processing, 62, No. 5, pp. 1093-1108. 2014.

Yang, J., Wright, J., Huang, T.S. and Ma, Y., 2010. "Image super-resolution via sparse representation." IEEE Transactions on Image Processing, 19(11), pp. 2861-2873. 2010.

Welinder, Peter, Steve Branson, Takeshi Mita, Catherine Wah, Florian Schroff, Serge Belongie, and Pietro Perona. "Caltech-UCSD birds 200." 2010, pp. 1-15.

Notification of Transmittal of International Search Report and the Written Opinion of the International Searching Authority for PCT/US2018/026951; dated Mar. 12, 2019.

International Search Report of the International Searching Authority for PCT/US2018/026951; dated Mar. 12, 2019.

Written Opinion of the International Searching Authority for PCT/US2018/026951; dated Mar. 12, 2019.

Ziming Zhang et al. 'Zero-Shot Learning via Joint Latent Similarity Embedding' In: The IEEE Conference on Computer Vision and Pattern Recognition (CVPR), 2016, pp. 6034-6042.

Notification and International Preliminary Report on Patentability (Chapter I) for PCT/US2018/026951; dated Aug. 7, 2019.

* cited by examiner

ZERO SHOT MACHINE VISION SYSTEM VIA JOINT SPARSE REPRESENTATIONS

CROSS-REFERENCE TO RELATED APPLICATIONS

This is a Non-Provisional patent application of U.S. Provisional Application No. 62/502,461, filed in the United States on May 5, 2017, entitled, "Zero Shot Machine Vision System via Joint Sparse Representations," the entirety of which is hereby incorporated by reference.

BACKGROUND OF INVENTION

(1) Field of Invention

The present invention relates to a system for recognizing novel objects and, more particularly, to a system for recognizing novel objects by modeling the relationship between visual features and semantic attributes using joint sparse representations.

(2) Description of Related Art

Zero-shot learning is being able to solve a task despite not having received any training examples of that task. Zero shot machine vision methods are described by Akata et al. (see Literature Reference No. 1 of the List of Incorporated Literature References) and Romera et al. (see Literature Reference No. 2). In Literature Reference No. 1, the authors proposed a model that embeds the image features and the semantic attributes in a common space (i.e., a latent embedding), where the compatibility between them is measured via a bilinear function.

Romera et al. (see Literature Reference No. 2) proposed a general linear framework that relates image features, attributes, and classes. The method presented in Literature Reference No. 2 utilizes a principled choice of regularizers that enables the authors to drive a simple closed form solution to the problem. The major disadvantages of the above methods include: 1) oversimplifying the problem by assuming a linear relation between data features and semantic attributes, and 2) sensitivity to ad hoc regularizers that need to be tuned for each application.

Thus, a continuing need exists for a system that improves the zero-shot capability of a machine vision system by leveraging a mathematically rigorous model that encodes the relationship between an object and its semantic attributes.

SUMMARY OF INVENTION

The present invention relates to a system for recognizing novel objects and, more particularly, to a system for recognizing novel objects by modeling the relationship between visual features and semantic attributes using joint sparse representations. The system comprises one or more processors and a non-transitory computer-readable medium having executable instructions encoded thereon such that when executed, the one or more processors perform multiple operations. A training image set is used to learn a model that maps visual features from known images to semantic attributes. The learned model is used to map visual features of an unseen input image to semantic attributes. The unseen input image is classified as belonging to an image class with a class label. A device is controlled based on the class label.

In another aspect, the device is a vehicle component, and the vehicle component is controlled to cause a vehicle operation to be performed, wherein the vehicle operation is at least one of braking and turning.

In another aspect, the system generates a training image set comprising images of objects from a plurality of image classes, wherein each image in the training image set has been annotated with a class label and semantic attributes.

In another aspect, a convolutional neural network (CNN) extracts visual features from known images.

In another aspect, the learned model is a joint-sparse dictionary model which provides a joint representation for visual features and semantic attributes.

In another aspect, the system extracts visual features from the unseen input image. For each extracted image feature, the system determines a sparse representation of the unseen input image. The system determines at least one image attribute using the sparse representation of the unseen input image. The class label for the unseen input image is determined by mapping the at least one image attribute to a label space.

In another aspect, a Lasso problem is solved to determine the sparse representation of the unseen input image.

In another aspect, the system is a zero-shot learning machine-vision system.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
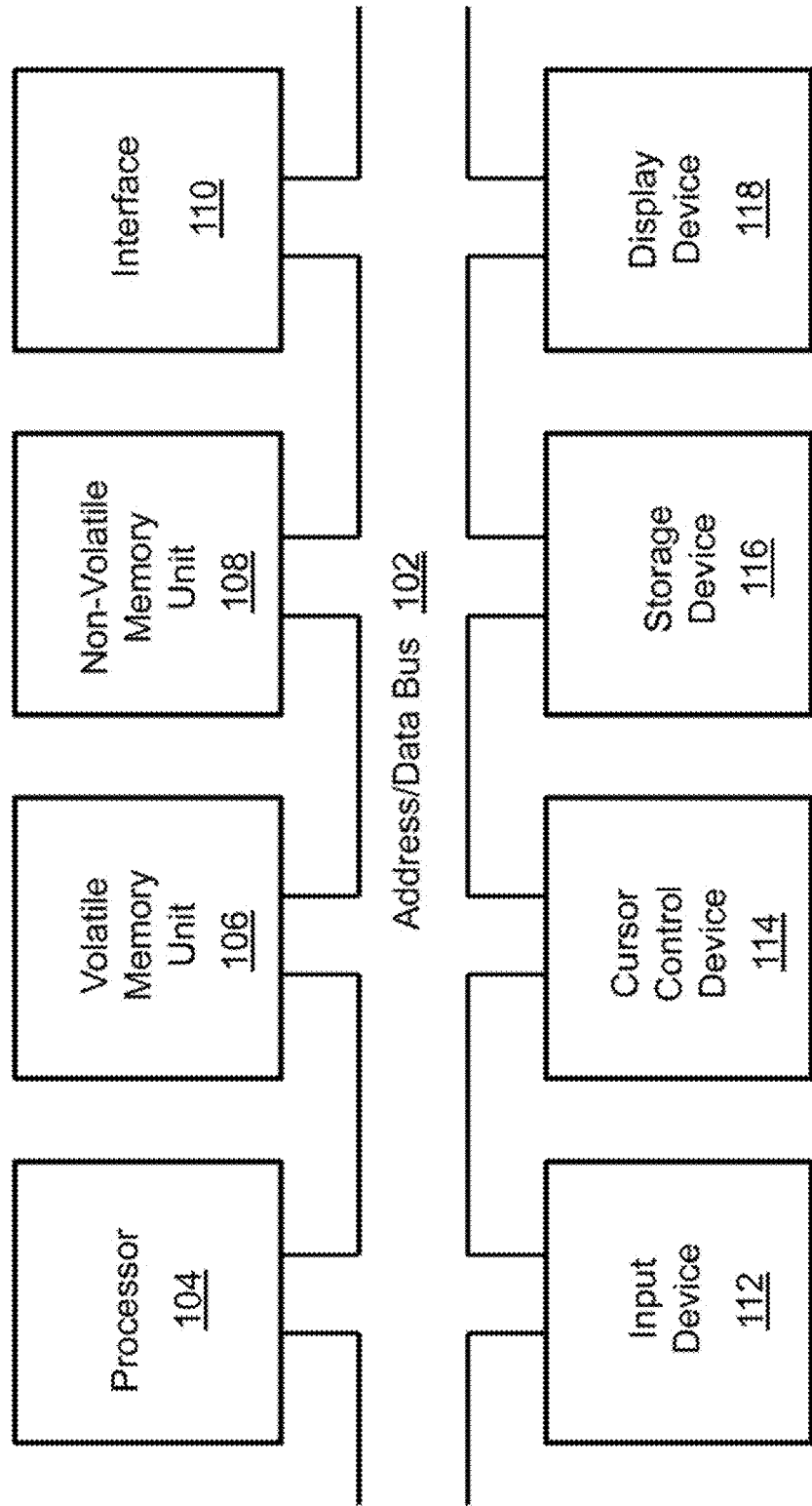
FIG. 1 is a block diagram depicting the components of a system for recognizing novel objects according to some embodiments of the present disclosure.

The present invention relates to a system for recognizing novel objects and, more particularly, to a system for recognizing novel objects by modeling the relationship between visual features and semantic attributes using joint sparse representations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:
1. Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826. 2013.
2. Romera-Paredes, Bernardino, and P. H. S. Torr. "An embarrassingly simple approach to zero-shot learning." In Proceedings of The 32nd International Conference on Machine Learning, pp. 2152-2161. 2015.
3. Simonyan, Karen, and Andrew Zisserman. "Very deep convolutional networks for large-scale image recognition." arXiv preprint arXiv:1409.1556. 2014.
4. Mikolov, T., Sutskever, I., Chen, K., Corrado, G. S. and Dean, J., 20. "Distributed representations of words and phrases and their compositionality." In Advances in Neural Information Processing Systems, pp. 3111-3119. 2013.
5. Tibshirani, Ryan J. "The lasso problem and uniqueness." Electronic Journal of Statistics, 7, pp. 1456-1490. 2013.
6. Huang, Yongwei, and Daniel P. Palomar. "Randomized algorithms for optimal solutions of double-sided QCQP with applications in signal processing." IEEE Transactions on Signal Processing, 62, no. 5, pp. 1093-1108. 2014.
7. Yang, J., Wright, J., Huang, T. S. and Ma, Y., 2010. "Image super-resolution via sparse representation." IEEE Transactions on Image Processing, 19(11), pp. 2861-2873. 2010.
8. Welinder, Peter, Steve Branson, Takeshi Mita, Catherine Wah, Florian Schroff, Serge Belongie, and Pietro Perona. "Caltech-UCSD birds 200." 2010.

(2) Principal Aspects

Various embodiments of the invention include three "principal" aspects. The first is a system for recognizing novel objects. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
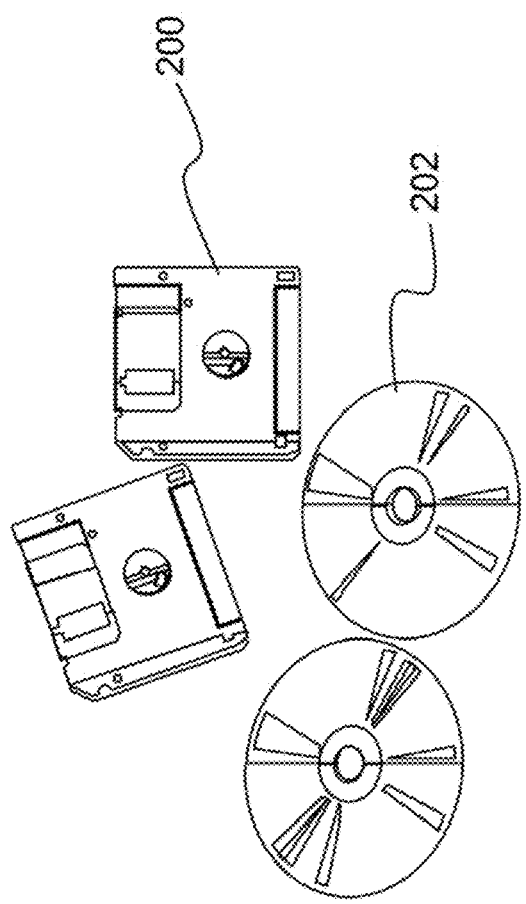
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a "zero-shot learning" (ZSL) machine vision system that can recognize novel objects that the system has never before seen. In the training phase, the system according to embodiments of the present disclosure takes as input a set of training images containing objects from many classes of interest, where each object image has been annotated with both a class label (e.g., "bear", "car", "house") and several semantic attributes (e.g., "can fly", "has wheels", "green").

The invention then uses the training image set and annotated attributes to train a model that maps low level image features (such as edges, corners, gradients) to semantic attributes. Then, in the testing phase, the system takes as input an image of an object not in the training set, and uses the learned model to map test image features to semantic attributes, so that, given a semantic description for the test object, the test image can be correctly classified despite the test object not being present in the training image set. The invention uniquely models the relationship between visual features and semantic attributes using joint sparse representations with respect to dictionaries of visual features and semantic attributes.

The ZSL machine-vision system described herein incorporates joint sparse dictionary learning to model the relationship between visual features of an object and its semantic attributes. The main assumption behind ZSL systems is that the training and test classes are connected through semantic auxiliary information obtained from other sources of information (e.g., a word description of the new class) or different sensor modalities. The system according to embodiments of this disclosure improves the zero-shot capability of a machine vision system by leveraging a mathematically rigorous model that encodes the relationship between object and its semantic attributes. This joint-sparse dictionary model significantly improves the machine vision system's recognition rates of novel classes that are not part of the training set.

The system can be utilized to recognize novel objects or scenes in camera images. The camera may be electric optical, infrared (IR), short wave IR, or similar, such that the output is an intensity image with one or more color-like channels. In the ZSL problem, one would like to identify relationships between image features and attributes. The joint dictionary learning method described herein is a natural fit for this purpose. In short, the feature space and the attribute space are modeled as nonlinear spaces characterized by union of low dimensional linear spaces. The two nonlinear spaces are constrained to have homologous components, hence the name joint dictionaries, and they are modeled to provide same representation for image features and their corresponding attributes.

(3.1) Training Phase

Figure 3:
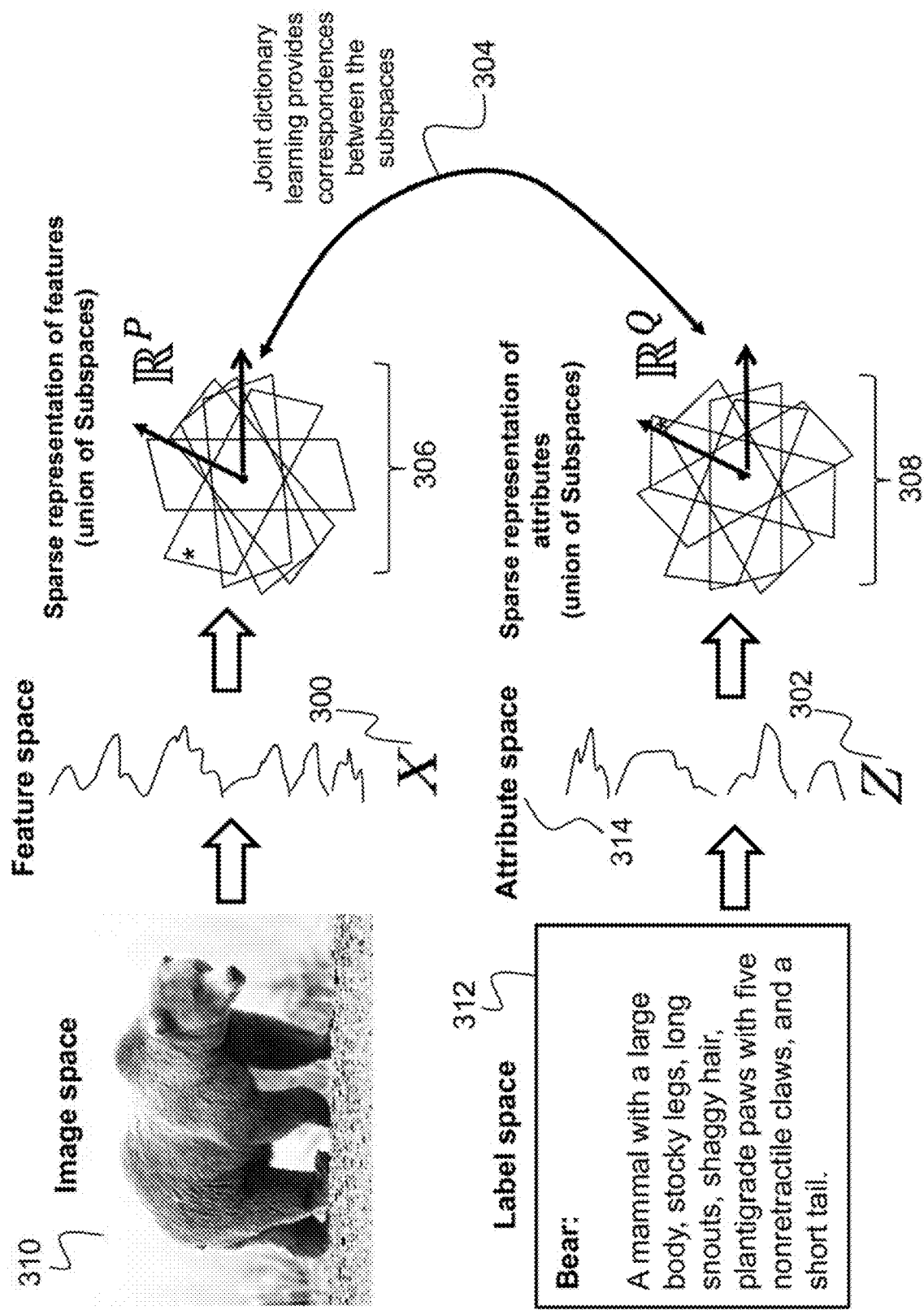
FIG. 3 is an illustration of the training phase of the zero-shot machine vision system according to some embodiments of the present disclosure.

FIG. 3 depicts the training phase of the zero-shot machine vision system according to embodiments of the present disclosure. The image features (element 300) are extracted from a deep convolutional neural network, while word2vec (which is described in Literature Reference No. 4) is used to extract attributes (element 302) from the verbal description of the class. The joint dictionary learning approach (element 304) enforces the sparse representation of features (element 306) and their corresponding attributes (element 308) to be the same.

In the training phase, there is a set of known images (i.e., image space 310) and their corresponding semantic attributes (i.e., label space 312), as well as the semantic attributes for the unseen images. First, a pre-trained Convolutional Neural Network (CNN) (see Literature Reference No. 3) is utilized to extract features (element 300) from the known images (element 310). CNNs have been shown in prior art to be extremely efficient at extracting features from camera images. Let $X=[x_1, \ldots, x_N] \in R^{P \times N}$ represent features (element 300) extracted from images in the dataset and let $Z=[z_1, \ldots, z_N] \in R^{Q \times N}$ represent the corresponding attributes (element 302) for the images. The word 'attributes' is used in its broadest sense, which encompasses word embeddings or any other semantic information for the images. Moreover, let $Z'=[z'_1, \ldots, z'_M] \in R^{Q \times M}$ be the attributes of the unseen images.

Denote the label for the i'th image as $y_i \in R^K$, where the camera image can potentially have multiple memberships of the K classes. The mapping from the attribute space (element 314) to the label space (element 312) is conventionally considered to be linear, $y_i = W z_i$, and known. To further clarify the problem, consider a common scenario in ZSL in which images of horses and tigers are included in X, but X does not contain images of zebras. On the other hand, the semantic attributes contain information of all seen (Z) and unseen (Z') images, including the zebras. Semantic attributes in this case could be the verbal definition of animals (e.g., 'a zebra is a white horse-like animal with black tiger-like stripes'). It can be seen that, by learning the relationship between the image features (element 300) and the attributes (element 302) 'horse-like' and 'has stripes' from the seen images (element 310), one should be able to assign the unseen zebra image to its corresponding attribute.

In the invention described herein, two dictionaries are learned (element 304) with corresponding atoms for X (element 300) and [Z, Z'] (element 302) which provide identical sparse representation, $a_i$, for $x_i$ and $z_i$. The idea is then for the j'th unseen image, the sparse representation of the image, $b_j$, should be close to the sparse representation of $z'_j$. More precisely, in the training phase the problem can be formulated as, $$D^*_x, D^*_z, A^*, B^* = \operatorname{argmin}_{D_x, D_z, A, B} \|X - D_x A\|_F^2 + \|Z - D_z A\|_F^2 + \|Z' - D_z B\|_F^2 + \lambda(\|A\|_1 + \|B\|_1)$$

$$s.t. \|D_x^{[i]}\|_2, \|D_z^{[i]}\|_2 \leq 1, \forall i \in \{1, \ldots, L\} \quad (1)$$

where $D_x \in R^{P \times L}$ is the image feature dictionary, $D_z \in R^{Q \times L}$ is the attribute dictionary, $A \in R^{L \times N}$ is the joint sparse representation of X and Z, $B \in R^{L \times M}$ is the sparse representation of Z', $D_x^{[i]}$ and $D_z^{[i]}$ are the i'th columns of corresponding matrices, and $\lambda$ is the sparse regularization parameter. Note that $\lambda$ and L are tunable parameters in of the system described herein. Equation (1) is not convex in ($D_z$, $D_x$, A, B); it is convex in each individual parameter given the rest. Hence, an iterative scheme was devised to solve for one variable at a time and fixing the others, until convergence is achieved. The details of the algorithm are given below.

(3.1.1) Algorithm

Start by initializing $D_x$ and $D_z$ to be random matrices with normal distribution. Then, the variables (i.e., dictionaries (element 304) and sparse representations (elements 306 and 308)) are trained by iterating through the following steps:

1. Update A via the following Lasso problem (see Literature Reference No. 5 for a description of the Lasso problem) according to the following:

$$\operatorname{argmin}_A \frac{1}{2} \left\| \begin{bmatrix} X \\ Z \end{bmatrix} - \begin{bmatrix} D_x \\ D_z \end{bmatrix} A \right\|_F^2 + \lambda \|A\|_1$$

2. Update B via the following Lasso problem according to the following:

$$\operatorname{argmin}_A \frac{1}{2} \|Z' - D_z B\|_F^2 + \lambda \|B\|_1$$

3. Update $D_x$ via the following Quadratically Constrained Quadratic Programming (QCQP) problem (see Literature Reference No. 6 for a description of the QCQP problem) according to the following:

$$\operatorname{argmin}_{D_x} \frac{1}{2} \|X - D_x A\|_F^2, s.t. \|D_x^{[i]}\|_2 \leq 1$$

4. Update $D_z$ via the following QCQP problem according to the following:

$$\operatorname{argmin}_{D_z} \frac{1}{2} \|[Z, Z'] - D_z [A, B]\|_F^2, s.t. \|D_z^{[i]}\|_2 \leq 1$$

The above steps are repeated until convergence is achieved. The training phase is completed after convergence of the above algorithm.

(3.2) Testing Phase

Figure 4:
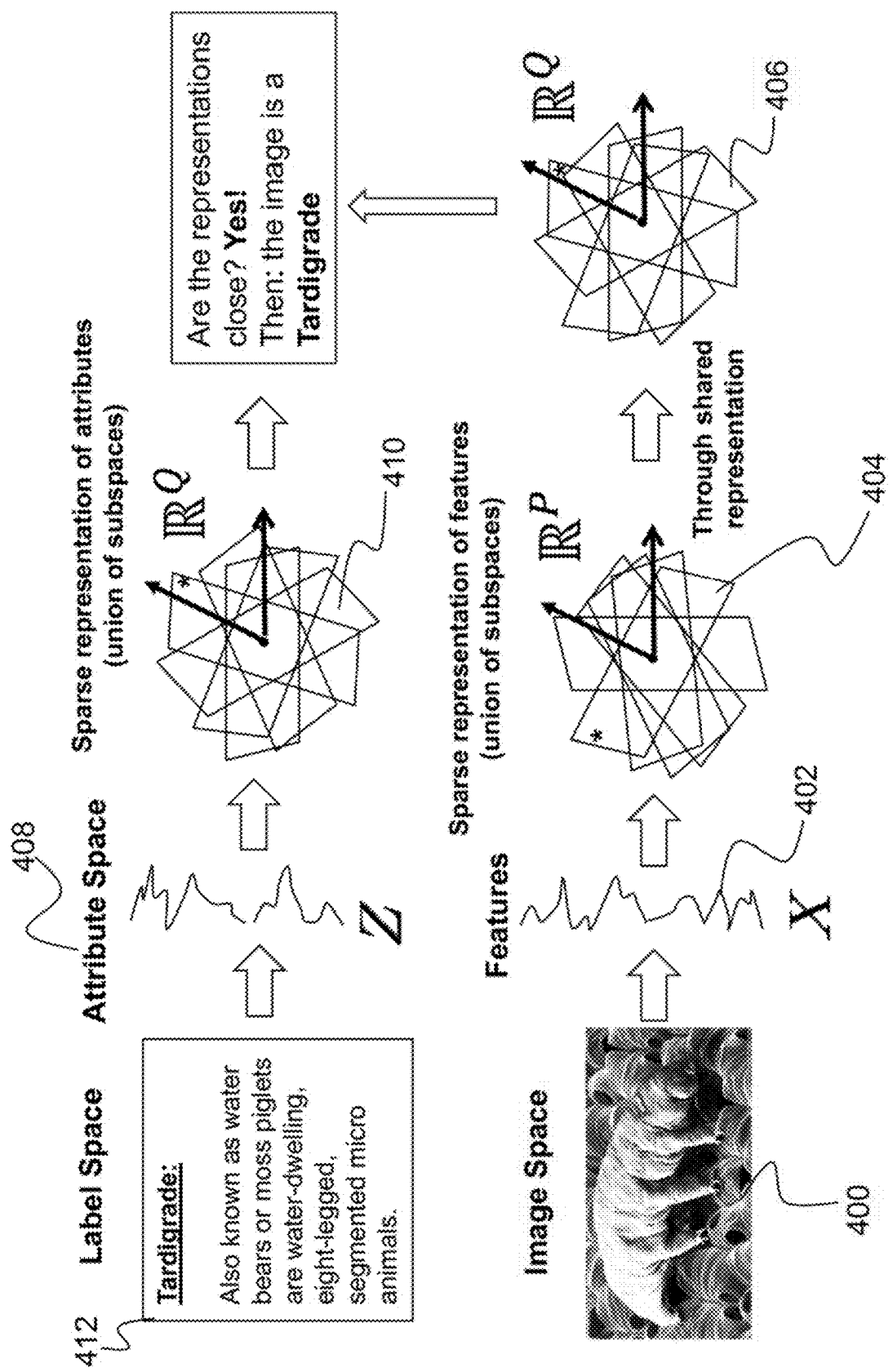
FIG. 4 is an illustration of zero-shot machine vision on an input image not previously seen according to some embodiments of the present disclosure.

As depicted in FIG. 4, for an input image not previously seen (element 400), the image features (element 402) are first extracted using a deep convolutional neural network and a Lasso problem is solved to find the sparse representation of the image (element 404). Given that the sparse representation is shared among features and attributes, image attributes are estimated (element 406), and the closest attribute in the attribute space (element 408) is found.

In the testing phase, for a feature extracted from an unseen image (element 400), $x \in R^P$, find its sparse representation (element 404) by solving the following Lasso problem:

$$b^* = \operatorname{argmin}_b \|x - D_x b\|_2^2 + \lambda \|b\|_1.$$

Then, following the common assumption that the input image is not seen before, the corresponding attribute is reconstructed as follows:

$$z^* = \operatorname{argmin}_{z \in Z'} \|z - D_z b^*\|_2^2.$$

When the above assumption does not hold, meaning that one does not know if the object has been seen before or not, the following alternative to the above equation is used:

$$z^* = \operatorname{argmin}_{z \in \{Z, Z'\}} \|z - D_z b^*\|_2^2.$$

Finally, the label for the unseen image (element 400) is found by mapping the found attribute (element 410) to the label space=Wz* (element 412).

Figure 5:
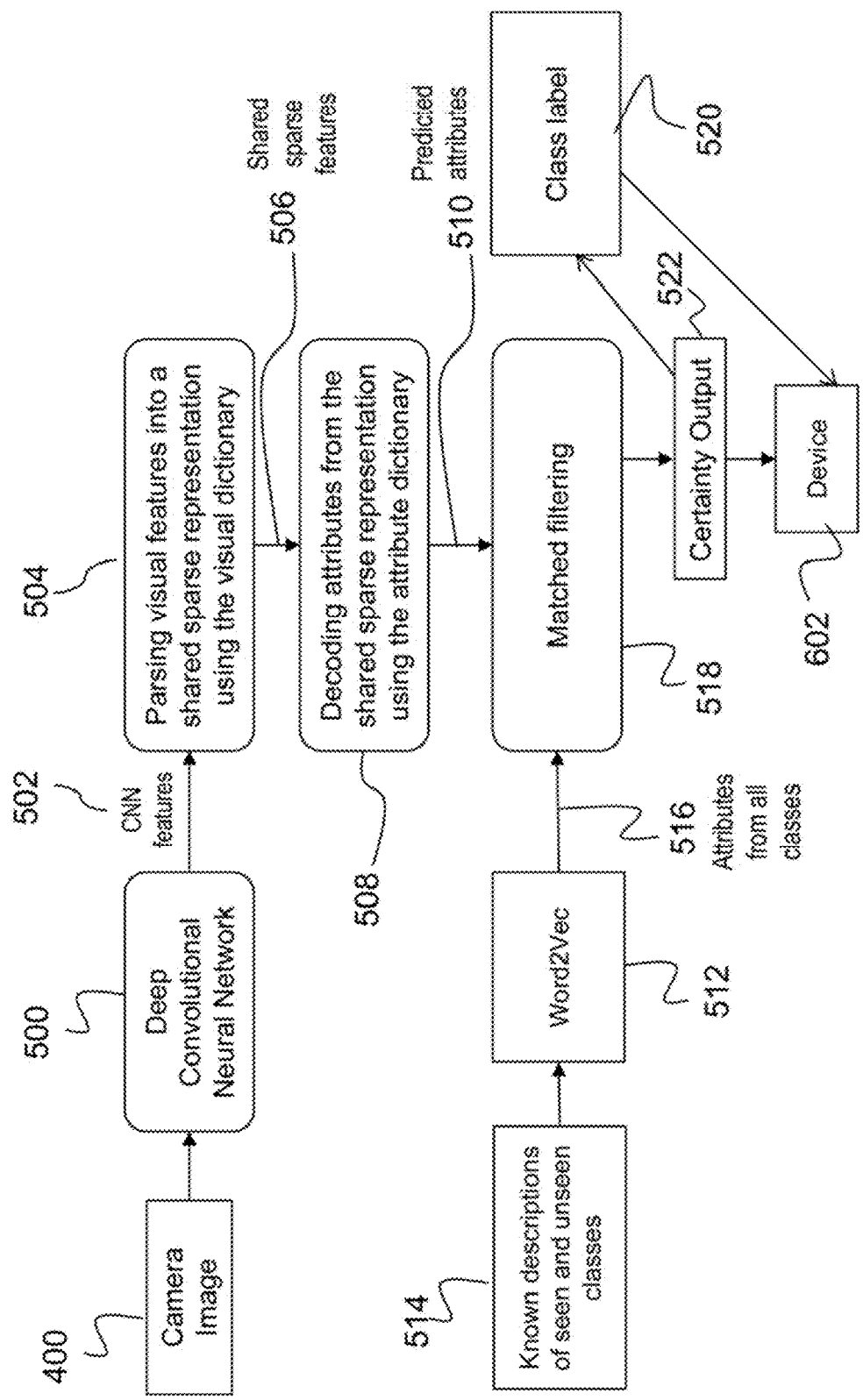
FIG. 5 is an illustration of the process flow of a system for classifying input data belonging to an unseen class of images according to some embodiments of the present disclosure.

FIG. 5 is an illustration of the process flow of a system for classifying input data belonging to an unseen class of images according to some embodiments of the present disclosure. For an input image not previously seen (element 400), image features are extracted using a deep convolutional neural network (element 500), resulting in CNN features 502. The visual features (CNN features 502) are parsed into a shared sparse representation using the visual dictionary (element 504), resulting in shared sparse features (element 506). Attributes from the shared sparse representation are decoded using the attribute dictionary (element 508), resulting in predicted attributes (element 510). While the CNN features 502 are extracted from the deep convolutional neural network (element 500), word2vec (element 512) (which is described in Literature Reference No. 4) is used to extract known descriptions of seen and unseen classes (element 514) from the verbal description of the class, resulting in attributes from all classes (element 516). The joint dictionary learning approach enforces the sparse representation of features (from element 508) and their corresponding attributes (element 516) to be the same through matched filtering (element 518).

The matched filtering module (element 518) calculates the pairwise Euclidean distances between the predicted/decoded attribute (element 508) and the attributes from all classes (element 516). Matched filtering (element 518) outputs the class label (element 520) that corresponds to the minimum distance with the predicted/decoded attribute. In addition, it generates a certainty output (element 522), which is a probability vector calculated from the pairwise Euclidean distances for the controller to make decisions. The uncertainty output (element 522) of the matched filtering (element 518) is a rich representation that contains the information for identifying the class label (element 520).

Then, the certainty output (element 522) identifies the degree of match between the predicted/decoded attribute (element 508) and the attributes from all classes (element 516), where 1 is a perfect match with a class and 0 is not a match at all. Intermediate values represent a degree of match. Through matched filtering (element 518), the degree of match can be compared to a user defined threshold. If the threshold is exceeded, a device (element 602), such as a motor vehicle component, is given a command (e.g., braking, turning). In this example, if the threshold is not exceeded, the motor vehicle is brought to a stop in a safe and controlled manner.

A class label (element 520) for the unseen input image (element 400) is determined by mapping image attributes to a label space, as described above. The class label (element 520) can, likewise, be used to control a device (element 602), which will be described in further detail below.

(3.3) Experimental Studies

To test the system according to embodiments of the present disclosure, the Caltech-UCSD Birds 200 (CUB 200) dataset, which is a popular dataset used in zero-shot learning, was used. The dataset consists of more than 6,000 images of birds belonging to 200 categories. The dataset provides 312 bird specific attributes. The attributes include, but are not limited to, 'has solid wing pattern', 'has spotted wing pattern', 'has buff back color'. The dataset is annotated through Amazon's Mechanical Turk.

In training, 150 bird classes were used. A pre-trained convolutional neural network (CNN) (see Literature Reference No. 3 for a description of CNNs) was used to extract features from images. The parameters of the system were chosen as follows:
Q=312 (Attributes' dimension)
P=4096 (Image features' dimension)
L=7,000 (Number of dictionary attoms)
K=200 (Number of classes)

The dictionaries, $D_x \in R^{P \times L}$ and $D_z \in R^{Q \times L}$ were initially set to random matrices and they were iteratively learned from the training data. In the testing phase, the test images belonging to the 50 held-out categories (i.e., classes) were fed to the system and the system was able to classify these 50 classes with about 35% accuracy, which is far above chance (i.e., 2%).

It was noted that the reported results are preliminary tests and could be significantly improved via tuning the parameters (e.g., $\lambda$, and L in Equation (1)) more carefully. In addition, using image features from a CNN, which is specifically trained for detecting and recognizing birds, could also improve the results.

The invention disclosed herein directly addresses the need for robust machine vision systems on autonomous platforms (e.g., drones, unmanned aerial vehicles (UAVs)) and autonomous vehicles. The system provides the capability of effectively adapting to novel scenarios (e.g., novel objects, weather conditions). Current state-of-the-art machine vision systems require large amounts of training data covering a wide range of classes for all possible scenarios. Obtaining annotated data for all visual classes is practically impossible and, hence, there is a dire need for learning systems that can transfer and adapt their learned knowledge to reason about novel classes. The joint sparse visual feature and sematic attribute modeling system according to embodiments of the present disclosure enables one to perform zero-shot machine vision with much fewer training examples.

Figure 6:
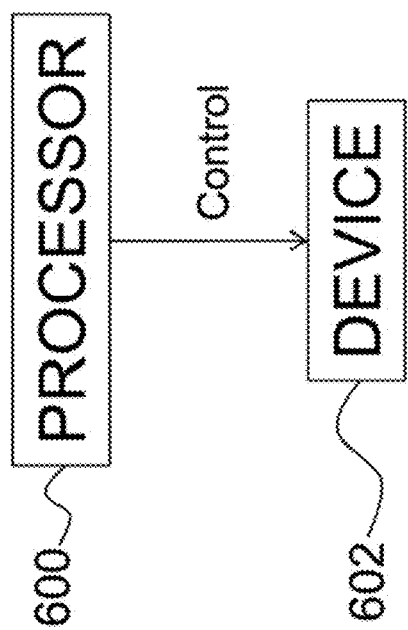
FIG. 6 is a flow diagram illustrating control of devices using the labels for unseen instances according to some embodiments of the present disclosure.

FIG. 6 is a flow diagram illustrating using a processor 600 to control a device 602 using the class labels for unseen instances. Non-limiting examples of devices 602 that can be controlled via the processor 600 and the labels for unseen instances include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

The invention provides a key functionality for extension of autonomous vehicle operation to new situations and road conditions. It will enable autonomous vehicles to operate effectively outside carefully mapped and controlled geographical areas and conditions (e.g., new traffic signs, new areas, new road types, or new object classes not observed in training time). For instance, in generating a label for an unseen instance, the system described herein can associate the unseen instance with a new traffic sign and cause the autonomous vehicle to perform a driving operation/manuever in line with driving parameters in accordance with the new traffic sign. For example, if the sign is a stop sign, the system may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

Additionally, the system can be embedded in autonomous robotic vehicles, such as UAVs and UGVs, and self-driving vehicles. For instance, in a self-driving vehicle, the system can be used for collision avoidance. In this example, if the system detects an object in its path (e.g., a pedestrian, another vehicle), an alert is sent to the vehicle operating system to cause the vehicle to perform a braking operation. Alternatively, the alert may signal that the vehicle operating system should perform a swerving motion around the object, involving steering and accelerating operations or any other operations as required to provide for collision avoidance. Further, the object detected may be a road sign, such as a stop sign. Upon classification of the stop sign, an alert can be sent to the vehicle operating system causing the vehicle to brake or otherwise adhere to the message as conveyed by the road sign.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for object recognition, the system comprising: one or more processors and a non-transitory computer-readable medium having executable instructions encoded thereon such that when executed, the one or more processors perform operations of:
    using a training image set, learning a model that maps visual features from known images to semantic attributes,
    wherein the learned model is a joint-sparse dictionary model which provides a joint representation for visual features and semantic attributes;
    using the learned model to map visual features of an unseen input image to semantic attributes;
    classifying, with a class label, the unseen input image as belonging to an image class; and
    controlling a device based on the class label.

2. The system as set forth in claim 1, wherein the device is a vehicle component, and wherein the one or more processors further perform an operation of controlling the vehicle component to cause a vehicle operation to be performed, wherein the vehicle operation is at least one of braking and turning.

3. The system as set forth in claim 1, wherein the one or more processors further perform an operation of generating a training image set comprising images of objects from a plurality of image classes, wherein each image in the training image set has been annotated with a class label and semantic attributes.

4. The system as set forth in claim 1, wherein a convolutional neural network (CNN) extracts visual features from known images.

5. The system as set forth in claim 1, wherein the one or more processors further perform operations of:
    extracting visual features from the unseen input image;
    for each extracted image feature, determining a sparse representation of the unseen input image; and
    determining at least one image attribute using the sparse representation of the unseen input image; and
    determining the class label for the unseen input image by mapping the at least one image attribute to a label space.

6. The system as set forth in claim 5, wherein a Lasso problem is solved to determine the sparse representation of the unseen input image.

7. The system as set forth in claim 1, wherein the system is a zero-shot learning machine-vision system.

8. A computer implemented method for object recognition, the method comprising an act of:
    causing one or more processers to execute instructions encoded on a non-transitory computer-readable medium, such that upon execution, the one or more processors perform operations of:
    using a training image set, learning a model that maps visual features from known images to semantic attributes,
    wherein the learned model is a joint-sparse dictionary model which provides a joint representation for visual features and semantic attributes;
    using the learned model to map visual features of an unseen input image to semantic attributes;
    classifying, with a class label, the unseen input image as belonging to an image class; and
    controlling a device based on the class label.

9. The method as set forth in claim 8, wherein the one or more processors further perform an operation of generating a training image set comprising images of objects from a plurality of image classes, wherein each image in the training image set has been annotated with a class label and semantic attributes.

10. The method as set forth in claim 8, wherein a convolutional neural network (CNN) extracts visual features from known images.

11. The method as set forth in claim 8, wherein the one or more processors further perform operations of:
    extracting visual features from the unseen input image;
    for each extracted image feature, determining a sparse representation of the unseen input image; and
    determining at least one image attribute using the sparse representation of the unseen input image; and
    determining the class label for the unseen input image by mapping the at least one image attribute to a label space.

12. The method as set forth in claim 11, wherein a Lasso problem is solved to determine the sparse representation of the unseen input image.

13. A computer program product for object recognition, the computer program product comprising:
  computer-readable instructions stored on a non-transitory computer-readable medium that are executable by a computer having one or more processors for causing the processor to perform operations of:
    using a training image set, learning a model that maps visual features from known images to semantic attributes,
    wherein the learned model is a joint-sparse dictionary model which provides a joint representation for visual features and semantic attributes;
    using the learned model to map visual features of an unseen input image to semantic attributes;
    classifying, with a class label, the unseen input image as belonging to an image class; and
    controlling a device based on the class label.

14. The computer program product as set forth in claim 13, wherein the device is a vehicle component, and wherein the one or more processors further perform an operation of controlling the vehicle component to cause a vehicle operation to be performed, wherein the vehicle operation is at least one of braking and turning.

15. The computer program product as set forth in claim 13, wherein a convolutional neural network (CNN) extracts visual features from known images.

16. The computer program product as set forth in claim 13, further comprising instructions for causing the one or more processors to further perform operations of:
  extracting visual features from the unseen input image;
  for each extracted image feature, determining a sparse representation of the unseen input image; and
  determining at least one image attribute using the sparse representation of the unseen input image; and
  determining the class label for the unseen input image by mapping the at least one image attribute to a label space.

17. The computer program product as set forth in claim 16, wherein a Lasso problem is solved to determine the sparse representation of the unseen input image.

* * * * *